United States Patent
Wakita et al.

(10) Patent No.: US 8,372,546 B2
(45) Date of Patent: Feb. 12, 2013

(54) NON-AQUEOUS ELECTROLYTE BATTERY AND METHOD FOR MANUFACTURING THE SAME

(75) Inventors: Shinya Wakita, Fukushima (JP); Izaya Okae, Fukushima (JP)

(73) Assignee: Sony Corporation, Tokyo (JP)

( * ) Notice: Subject to any disclaimer, the term of this patent is extended or adjusted under 35 U.S.C. 154(b) by 711 days.

(21) Appl. No.: 12/366,410

(22) Filed: Feb. 5, 2009

(65) Prior Publication Data

US 2009/0202916 A1    Aug. 13, 2009

(30) Foreign Application Priority Data

Feb. 13, 2008    (JP) .................................. 2008-032182

(51) Int. Cl.
- *H01M 10/36* (2010.01)
- *H01M 4/04* (2006.01)
- *H01M 4/02* (2006.01)
- *H01M 4/62* (2006.01)

(52) U.S. Cl. ........ 429/331; 429/338; 429/199; 29/623.1

(58) Field of Classification Search .......... 429/326–335, 429/338, 199; 29/623.1
See application file for complete search history.

(56) References Cited

U.S. PATENT DOCUMENTS

| | | | |
|---|---|---|---|
| 5,529,859 A * | 6/1996 | Shu et al. ....................... | 429/331 |
| 5,874,616 A * | 2/1999 | Howells et al. ................. | 564/82 |
| 7,316,866 B2 | 1/2008 | Yong et al. | |
| 2001/0053485 A1 | 12/2001 | Shibuya et al. | |
| 2002/0110739 A1 * | 8/2002 | McEwen et al. ............... | 429/324 |
| 2005/0175898 A1 * | 8/2005 | Yong et al. .................. | 429/231.1 |
| 2007/0042267 A1 * | 2/2007 | Kim et al. ...................... | 429/200 |
| 2008/0014497 A1 * | 1/2008 | Sano et al. ..................... | 429/129 |
| 2008/0261113 A1 * | 10/2008 | Huang et al. .................. | 429/221 |

FOREIGN PATENT DOCUMENTS

| | | | |
|---|---|---|---|
| EP | 1030397 A2 * | 8/2000 | |
| EP | 1619734 A1 * | 1/2006 | |
| JP | 08-306364 | 11/1996 | |
| JP | 10-116629 | 5/1998 | |
| JP | 10-116630 | 5/1998 | |
| JP | 11-306859 | 11/1999 | |
| JP | 2001-085060 | 3/2001 | |
| JP | 2001-313075 | 11/2001 | |
| JP | 2004-087325 | 3/2004 | |
| JP | 2004-288470 | 10/2004 | |
| JP | 2004-331521 | 11/2004 | |
| JP | 2006-049158 | 2/2006 | |
| JP | 2007048560 A * | 2/2007 | |
| JP | 2007-112811 | 5/2007 | |
| JP | 2007-520032 | 7/2007 | |
| JP | 2002-251917 | 9/2009 | |

* cited by examiner

*Primary Examiner* — Gregg Cantelmo
(74) *Attorney, Agent, or Firm* — K&L Gates LLP

(57) ABSTRACT

A non-aqueous electrolyte battery includes a positive electrode, a negative electrode and a gel non-aqueous electrolyte, wherein at least one of the positive electrode and the negative electrode has an active material layer containing an ambient temperature molten salt and polyvinylidene fluoride; the ambient temperature molten salt and the polyvinylidene fluoride are complexed; the non-aqueous electrolyte contains one or more kinds of a non-aqueous solvent having a relative dielectric constant of 20 or more; and the content of the solvent having a relative dielectric constant of 20 or more in the non-aqueous electrolyte is 60% by mass or more relative to the whole of the non-aqueous solvent.

13 Claims, 3 Drawing Sheets

NON-AQUEOUS ELECTROLYTE BATTERY AND METHOD FOR MANUFACTURING THE SAME

CROSS REFERENCES TO RELATED APPLICATIONS

The present application claims priority to Japanese Patent Application JP 2008-032182 filed in the Japan Patent Office on Feb. 13, 2008, the entire contents of which is incorporated herein by reference.

BACKGROUND

The present application relates to a non-aqueous electrolyte battery which includes a non-aqueous electrolyte containing a non-aqueous solvent having a prescribed relative dielectric constant and which has largely improved battery characteristics.

A chargeable non-aqueous electrolyte secondary battery occupies an important position as a power source of portable electronic devices. In order to realize a reduction in size and weight of the electronic device, it has been demanded to devise to reduce the weight and size of a non-aqueous electrolyte secondary battery, thereby efficiently using a storage space within the electronic device. As such a non-aqueous electrolyte secondary battery, there are exemplified a lithium ion secondary battery and a polymer lithium battery each having high energy density and output density.

Such a non-aqueous electrolyte secondary battery includes a positive electrode, a negative electrode and a non-aqueous electrolyte. Concretely, a material capable of doping and dedoping a lithium ion is used for a positive electrode active material of the positive electrode and a negative electrode active material of the negative electrode. For example, lithium-transition metal oxides and the like are exemplified as the positive electrode active material, and specific examples thereof include $LiCoO_2$, $LiNiO_2$, $LiNiXCo_{(1-x)}O_2$ and $LiMn_2O_4$. Lithium and alloys thereof, carbon materials and the like are exemplified as the negative electrode active material, and graphite and the like are mainly used as the carbon material.

As to the non-aqueous electrolyte, in case of a lithium ion secondary battery, a non-aqueous electrolytic solution having a non-aqueous electrolyte salt dissolved in a non-aqueous solvent is used; and in case of a polymer lithium battery, a solid electrolyte obtained by gelatinizing a non-aqueous electrolytic solution with a polymer matrix is used. The non-aqueous solvent which is used for the non-aqueous electrolyte is prepared by mixing a high-boiling solvent having high dielectric constant and viscosity and a low-boiling solvent having low dielectric constant and viscosity.

Examples of the high-boiling solvent having high dielectric constant and viscosity include cyclic carbonic esters and lactones, for example, ethylene carbonate, propylene carbonate, γ-butyrolactone and γ-valerolactone. Since these solvents well dissolve an electrolyte salt therein, they are able to increase the number of lithium ions in the solvent. However, since the viscosity thereof is high, the mobility of a lithium ion becomes small.

Examples of the low-boiling solvent having low dielectric constant and viscosity include chain carbonic esters, for example, dimethyl carbonate, ethyl methyl carbonate and diethyl carbonate. These non-aqueous solvents hardly dissolve an electrolyte salt therein. However, since the viscosity thereof is low, the mobility of a lithium ion becomes high.

Accordingly, for the purposes of well dissolving an electrolyte salt and imparting an adequate viscosity, the non-aqueous electrolytic solution is prepared by mixing a high-boiling solvent having high dielectric constant and viscosity and a low-boiling solvent having low dielectric constant and viscosity as described above. However, in case of a polymer lithium battery, the choice of the non-aqueous electrolytic solution is restricted. In order to immerse the non-aqueous electrolytic solution in a polymer matrix, it is necessary to use a non-aqueous solvent having compatibility with the polymer matrix in the non-aqueous electrolytic solution. Also, in case of a polymer lithium battery, a soft aluminum laminated film is used as an exterior material. Therefore, in order to prevent swelling of the exterior material due to evaporation of the non-electrolytic solution from occurring, it is necessary to use a high-boiling non-aqueous solvent.

SUMMARY

However, in this non-aqueous electrolyte secondary battery, even when the foregoing mixed solvent is used as the non-aqueous solvent for the non-aqueous electrolyte, it is difficult to prepare a non-aqueous electrolyte from which satisfactory battery characteristics are obtainable. That is, in the non-aqueous electrolyte secondary battery, it is difficult to obtain a non-aqueous electrolyte having large ionic conductivity while making both a high dielectric constant and a low viscosity compatible with each other as in aqueous electrolytic solutions to be formed in, for example, a manganese dry battery, a lead battery, a nickel-hydrogen battery, etc.

For that reason, in the non-aqueous electrolyte secondary battery, even when a non-aqueous electrolyte using the foregoing mixed solvent is used, it is difficult to make both characteristics of a solvent having a high dielectric constant and those of a solvent having a low dielectric constant compatible with each other. For example, the ionic conductivity becomes small, an internal resistance increases, and in particular, when a large current is flown, battery characteristics, so-called load characteristics are lowered. Also, in the non-aqueous electrolyte secondary battery, when used under a low-temperature circumstance, the ionic conductivity becomes smaller so that the battery characteristics are more lowered.

As a method for solving such problems, for example, there is exemplified a method in which by making the thickness of the battery thin for the purpose of making it easy to flow the current, an internal resistance is suppressed, and a lowering of load characteristics is inhibited. However, according to such a method, there was involved a problem that, for example, the volume of a collector, a separator and the like in an electrode increases, and a proportion of active materials inside the battery decreases, leading to a lowering of the battery capacity.

Accordingly, under the foregoing circumstances of the related art, it is desirable to provide a non-aqueous electrolyte battery capable of devising to enhance battery characteristics by increasing an ionic conductivity of a positive electrode and/or a negative electrode and a method for manufacturing the same.

According to embodiments, a non-aqueous electrolyte battery and a method for manufacturing the same as described below are provided.

[1] A non-aqueous electrolyte battery including a positive electrode, a negative electrode and a gel non-aqueous electrolyte, wherein at least one of the positive electrode and the negative electrode has an active material layer containing an ambient temperature molten salt and polyvinylidene fluoride;

the ambient temperature molten salt and the polyvinylidene fluoride are complexed;

the non-aqueous electrolyte contains one or more kinds of a non-aqueous solvent having a relative dielectric constant of 20 or more; and the content of the solvent having a relative dielectric constant of 20 or more in the non-aqueous electrolyte is 60% by mass or more relative to the whole of the non-aqueous solvent.

[2] A method for manufacturing a non-aqueous electrolyte battery including a positive electrode, a negative electrode and a gel non-aqueous electrolyte, the method including the steps of:

using one or more kinds of a non-aqueous solvent having a relative dielectric constant of 20 or more as an aqueous solvent of the non-aqueous electrolyte, with the content of the non-aqueous solvent having a relative dielectric constant of 20 or more being 60% by mass or more relative to the whole of the non-aqueous solvent; and coating an electrode mixture coating solution containing an active material, an ambient temperature molten salt, polyvinylidene fluoride and a solvent on a collector and then volatizing the solvent to form at least one of a positive electrode active material layer and a negative electrode active material layer.

In the thus configured non-aqueous electrolyte battery, in a process of drying the electrode and volatilizing the solvent, the ambient temperature molten salt takes a form complexed with polyvinylidene fluoride, and the polyvinylidene fluoride exhibits high swelling properties against the solvent having a relative dielectric constant of 20 or more, namely a so-called high-relative dielectric constant solvent. Thus, the non-aqueous electrolyte containing a high-relative dielectric constant solvent is adequately taken into the polyvinylidene fluoride to be contained as a binder in the positive electrode and/or the negative electrode. According to this, in the non-aqueous electrolyte battery, the non-aqueous electrolyte containing a high-relative dielectric constant solvent can be uniformly spread over the positive electrode and/or the negative electrode.

Additional features and advantages are described herein, and will be apparent from the following Detailed Description and the figures.

DETAILED DESCRIPTION

A non-aqueous electrolyte battery to which the present application is applied is hereunder described in detail with reference to the accompanying drawings according to an embodiment.

Figure 1:
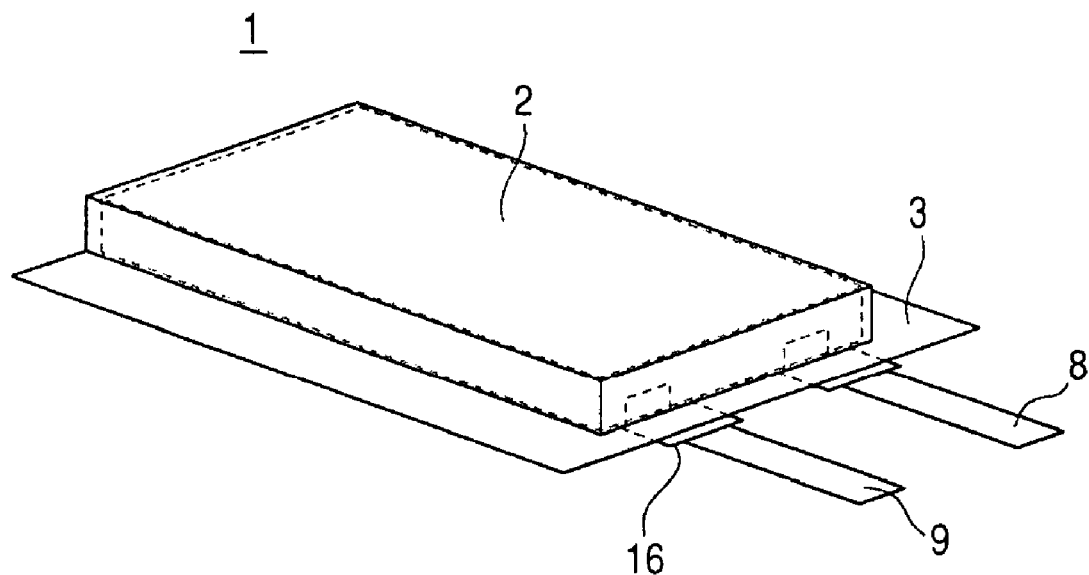
FIG. 1 is a perspective view of a non-aqueous electrolyte secondary battery according to an embodiment.
Figure 2:
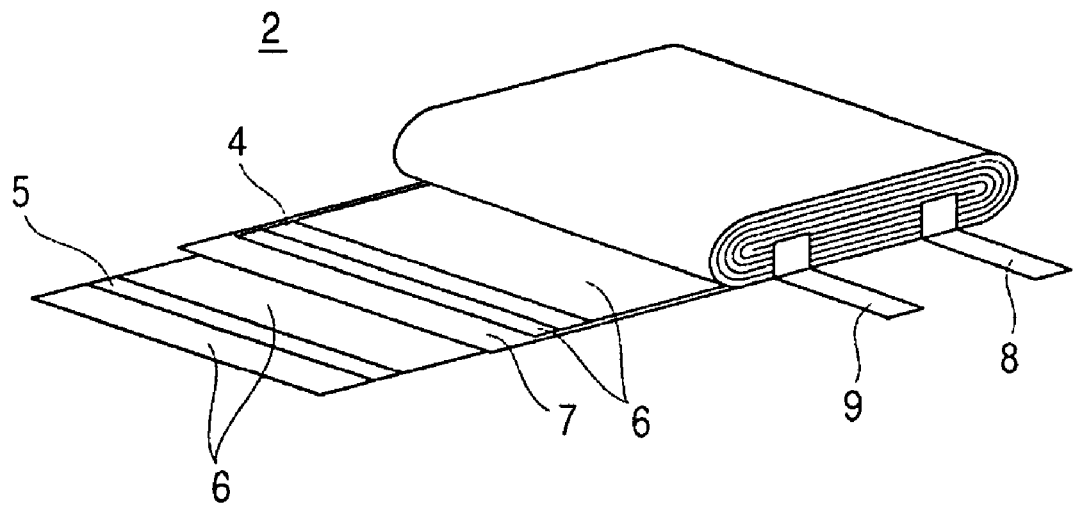
FIG. 2 is a perspective view of a battery element to be used in a non-aqueous electrolyte secondary battery according to an embodiment.

A non-aqueous electrolyte secondary battery 1 (hereinafter referred to as "battery 1") is a polymer lithium battery and, as shown in FIG. 1, is configured to include a battery element 2 as a power generation element and an exterior material 3 for containing the battery element 2 therein. As shown in FIG. 2, the battery element 2 is composed of a lengthily formed positive electrode 4; a lengthily formed negative electrode 5; a non-aqueous electrolyte 6 formed on the both surfaces of each of the positive electrode 4 and the both surfaces of the negative electrode 5 and having an electrolyte salt and a non-aqueous solvent; and a separator 7 intervening between the positive electrode 4 having a non-aqueous electrolyte 6 formed thereon and the negative electrode 5 having the non-aqueous electrolyte 6 formed thereon. The battery element 2 has a structure in which it is wound in a state that the separator 7 is made to intervene between the positive electrode 4 and the negative electrode 5 each having the non-aqueous electrolyte 6 formed thereon; a positive electrode lead 8 is connected to the positive electrode 4, and a negative electrode lead 9 is connected to the negative electrode 5; and the positive electrode lead 8 and the negative electrode lead 9 are projected from one end face thereof, respectively. According to this, the battery 1 has a structure in which the battery element 2 is sealed into the exterior material 3 in a state that the positive electrode lead 8 and the negative electrode lead 9, each of which is projected from one end face of the battery element 2, are interposed by the exterior material 3.

(Positive Electrode)

Figure 3:
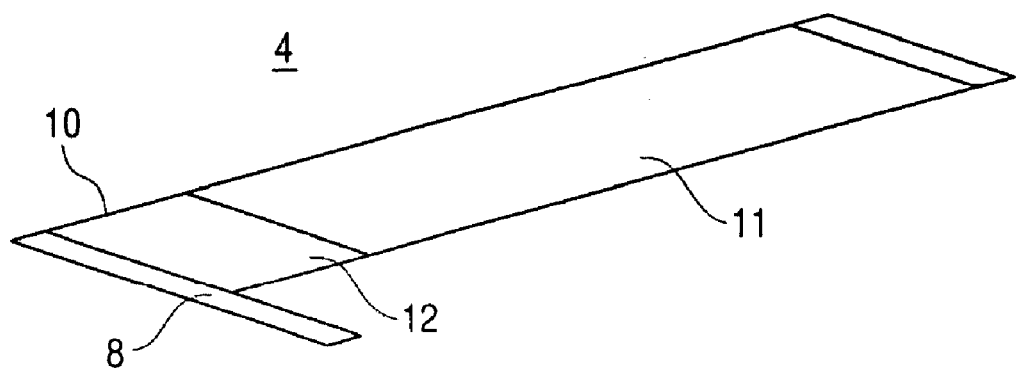
FIG. 3 is a perspective view of a positive electrode to be used in a non-aqueous electrolyte secondary battery according to an embodiment.

As shown in FIG. 3, the positive electrode 4 has a structure in which a positive electrode mixture coating solution containing a positive electrode active material, a conductive agent and a binder is coated on a positive electrode collector 10, dried and then applied with a pressure, thereby forming a positive electrode active material layer 11 on the positive electrode collector 10. The positive electrode collector 10 is constituted of a metal material, for example, aluminum, nickel, stainless steel, etc. Also, the positive electrode 4 is provided with a non-coated part 12 in which the positive electrode collector 10 is exposed, and the positive electrode lead 8 is connected to this non-coated part 12 such that it is projected in a width direction of the positive electrode collector 10. The positive electrode lead 8 is a strip-shaped metal piece composed of a conductive metal, for example, aluminum, etc. or the like.

A lithium complex oxide of lithium and a transition metal is used for the positive electrode active material. Specific examples of the positive electrode active material include $LiCoO_2$, $LiNiO_2$ and $LiMn_2O_4$. Also, a solid solution obtained by substituting a part of the transition metal element of the foregoing lithium complex oxide with other element, specifically $LiNi_{0.5}Co_{0.5}O_2$, $LiNi_{0.8}Co_{0.2}O_2$, etc. can be used as the positive electrode active material.

Examples of the conductive agent include carbon materials, for example, graphite, carbon black and ketjen black, and these materials may be used singly or in admixture of two or more kinds thereof. Also, in addition to the carbon material, metal materials and conductive polymer materials may be used so far as they are a material having conductivity.

Polyvinylidene fluoride (hereinafter referred to as "PVdF") is used for the binder. A structure obtained through copolymerization with chlorotrifluoroethylene (CTFE), hexafluoropropylene (HEP), etc. may also be taken.

(Negative Electrode)

Figure 4:
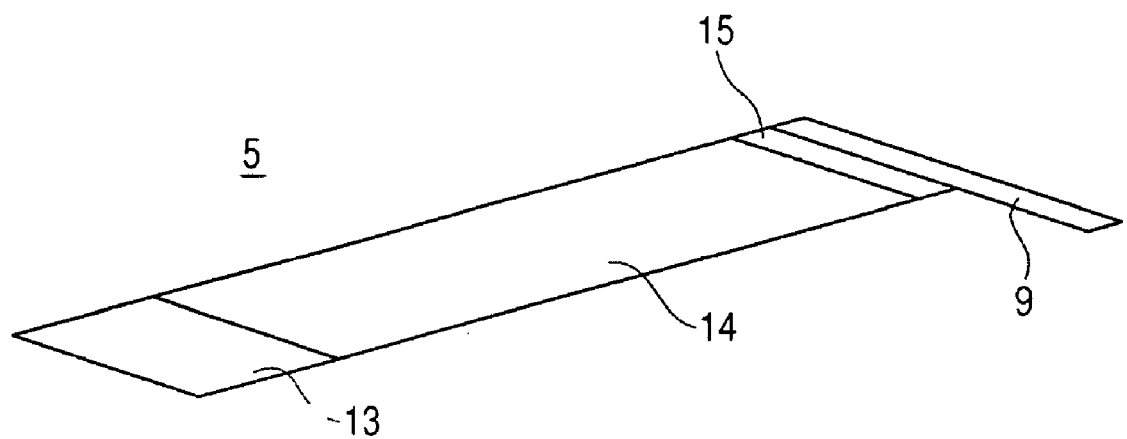
FIG. 4 is a perspective view of a negative electrode to be used in a non-aqueous electrolyte secondary battery according to an embodiment.

As shown in FIG. 4, the negative electrode 5 has a structure in which a negative electrode mixture coating solution containing a negative electrode active material and a binder is coated on a negative electrode collector 13, dried and then applied with a pressure, thereby forming a negative electrode active material layer 14 on the negative electrode collector 13. The negative electrode collector 13 is constituted of a metal material, for example, copper, nickel, stainless steel, etc. Also, the negative electrode 5 is provided with a non-coated part 15 in which the negative electrode collector 13 is exposed, and the negative electrode lead 9 is connected to this non-coated part 15 such that it is projected in a width direction of the negative electrode collector 13. The negative electrode lead 9 is a strip-shaped metal piece composed of a conductive metal, for example, nickel, etc. or the like.

One or plural kinds of a negative electrode material capable of doping and dedoping a lithium ion can be used as the negative electrode active material. Graphite prepared by mixing two or more kinds of graphite having a different average particle size from each other can be used as such a negative electrode material.

The binder contains PVdF. Furthermore, a publicly known binder such as styrene-butadiene rubber may be partly contained.

(Ambient Temperature Molten Salt)

The ambient temperature molten salt may be contained in both the positive electrode and the negative electrode or may be contained in either one of the positive electrode and the negative electrode. In the non-aqueous electrolyte battery according to an embodiment, PVdF and the ambient temperature molten salt are complexed. The term "complexed" as referred to herein means a state that the ambient temperature molten salt is occluded within a polymer network matrix of PVdF. According to this, the degree of crystallization of PVdF decreases, and the molecular mobility increases. In the case where the ambient temperature molten salt is contained in the positive electrode, when used in the battery 1, it acts to increase the ionic conductivity of the positive electrode 4, thereby enhancing the battery characteristics. Also, since the degree of crystallization of the binder becomes low, even in the case where the battery 1 is discharged under a low-temperature circumstance, the ambient temperature molten salt acts to suppress a lowering of the ionic conductivity of the positive electrode 4, thereby inhibiting a lowering of the low-temperature characteristics of the battery 1. In the case where the ambient temperature molten salt is contained in the negative electrode, by taking the ambient temperature molten salt into PVdF, similar to the case of the foregoing positive electrode 4, it acts against the binder so as to easily swell the non-aqueous solvent or the like to be contained in the non-aqueous electrolyte 6 into the negative electrode active material layer 14.

It is desirable that the content of the ambient temperature molten salt is from 0.1 to 5 parts by mass, and preferably from 0.1 to 1.0 part by mass relative to the total mass of the active material, the conductive agent and the binder in the active material layer. What the content of the ambient temperature molten salt falls within the foregoing range is preferable because excellent cycle characteristics are revealed due to an enhancement of the ionic conductivity of PVdF without lowering the battery capacity.

It is preferable that the ambient temperature molten salt contains a tertiary or quaternary ammonium salt composed of, for example, a tertiary or quaternary ammonium cation and a fluorine atom-containing anion. This is because by using the tertiary or quaternary ammonium salt, reductive decomposition of the electrolytic solution as described later can be inhibited. The ambient temperature molten salt may be used singly or in admixture of plural kinds thereof. The tertiary or quaternary ammonium cation also includes one having characteristics of a tertiary or quaternary ammonium cation.

Examples of the quaternary ammonium cation include a cation having a structure represented by the following formula (1).

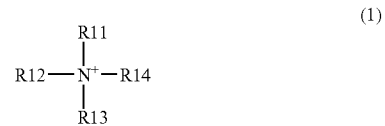

In the formula (1), R11 to R14 each independently represents an aliphatic group, an aromatic group, a heterocyclic group or a group in which a part of the element or elements of any one of these groups is substituted with a substituent. R11 to R14 may be the same or different.

Examples of the aliphatic group include an alkyl group and an alkoxyl group. Examples of the alkyl group include a methyl group, an ethyl group, a propyl group, a hexyl group and an octyl group. Examples of the group in which a part of the element or elements of the aliphatic group is substituted with a substituent include a methoxyethyl group. Examples of the substituent include a hydrocarbon group having from 1 to 10 carbon atoms, a hydroxyalkyl group and an alkoxyalkyl group.

Examples of the aromatic group include an aryl group.

Examples of the heterocyclic group include pyrrole, pyridine, imidazole, pyrazole, benzimidazole, piperidine, pyrrolidine, carbazole, quinoline, pyrrolidinium, piperidinium and piperazinium.

Examples of the cation having a structure represented by the formula (1) include an alkyl quaternary ammonium cation and a cation in which a part of the functional group or groups of the foregoing cation is substituted with a hydrocarbon group having from 1 to 10 carbon atoms, a hydroxyalkyl group or an alkoxyalkyl group. As the alkyl quaternary ammonium cation, $(CH_3)_3R5N^+$ (R5 represents an alkyl group or an alkenyl group each having from 3 to 8 carbon atoms) is preferable. Examples of such a cation include a trimethylpropylammonium cation, a trimethyloctylammonium cation, a trimethylallylammonium cation, a trimethylhexylammonium cation and an N,N-diethyl-N-methyl-N-(2-methoxyethyl)ammonium cation.

Also, as the tertiary or quaternary ammonium cation other than the cation having a structure represented by the formula (1), a nitrogen-containing heterocyclic cation having a structure represented by any one of the following formulae (2) to (5) is exemplified. The nitrogen-containing heterocyclic cation as referred to herein refers to one having a positive charge on the nitrogen atom constituting a heterocyclic ring as represented by any one of the formulae (2) to (5).

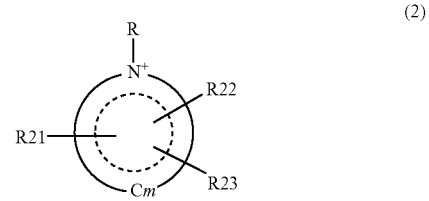

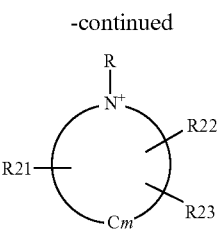

(3)

The formula (2) represents a structure having a conjugated bond; and the formula (3) represents a structure not having a conjugated bond. In the formulae (2) and (3), m is from 4 to 5; R21 to R23 each independently represents a hydrogen atom, an alkyl group having from 1 to 5 carbon atoms, an alkoxy group, an amino group or a nitro group and may be the same or different; R represents a hydrogen atom or an alkyl group having from 1 to 5 carbon atoms; and the nitrogen atom is a tertiary or quaternary ammonium cation.

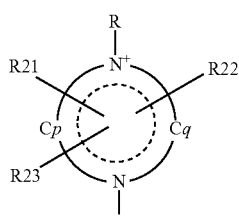

(4)

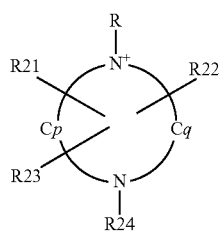

(5)

The formula (4) represents a structure having a conjugated bond; and the formula (5) represents a structure not having a conjugated bond. In the formulae (4) and (5), p is from 0 to 2; (p+q) is from 3 to 4; R21 to R23 each independently represents a hydrogen atom, an alkyl group having from 1 to 5 carbon atoms, an alkoxy group, an amino group or a nitro group and may be the same or different; R24 represents an alkyl group having from 1 to 5 carbon atoms; R represents a hydrogen atom or an alkyl group having from 1 to 5 carbon atoms; and the nitrogen atom is a tertiary or quaternary ammonium cation.

Examples of the nitrogen-containing heterocyclic cation having a structure represented by any one of the formulae (2) to (5) include a pyrrolium cation, a pyridinium cation, an imidazolium cation, a pyrazolium cation, a benzimidazolium cation, an indolium cation, a carbazolium cation, a quinolinium cation, a pyrrolidinium cation, a piperidinium cation, a piperazinium cation and a cation in which a part of the functional group or groups of any one of these cations is substituted with a hydrocarbon group having from 1 to 10 carbon atoms, a hydroxyalkyl group or an alkoxyalkyl group. Examples of such a nitrogen-containing heterocyclic cation include an ethylmethylimidazolium cation and an N-methyl-N-propylpiperidinium cation.

Examples of the fluorine atom-containing anion include $BF_4^-$, $PF_6^-$, $C_nF_{2n+1}CO_2^-$ (n represents an integer of from 1 to 4), $C_mF_{2m+1}SO_3^-$ (m represents an integer of from 1 to 4), $(FSO_2)_2N^-$, $(CF_3SO_2)_2N^-$, $(C_2F_5SO_2)_2N^-$, $(CF_3SO_2)(C_4F_9SO_2)N^-$, $(CF_3SO_2)_3C^-$, $CF_3SO_2-N^--COCF_3$ and $R5-SO_2-N^--SO_2CF_3$ (R5 represents an aliphatic group or an aromatic group). Of these, $BF_4^-$, $(F-SO_2)_2-N^-$, $(CF_3-SO_2)_2-N^-$, $(C_2F_5SO_2)_2N^-$ and $(CF_3SO_2)(C_4F_9SO_2)N^-$ are preferable; and $BF_4^-$, $(F-SO_2)_2-N^-$ and $(CF_3-SO_2)_2-N^-$ are more preferable.

As the ambient temperature molten salt composed of a cation having a structure represented by the formula (1) and a fluorine atom-containing anion, one composed of an alkyl quaternary ammonium cation and a fluorine atom-containing anion is especially preferable. Above all, an ambient temperature molten salt using, as the alkyl quaternary ammonium cation, $(CH_3)_3R5N^+$ (R5 represents an alkyl group or an alkenyl group each having from 3 to 8 carbon atoms) and, as the fluorine atom-containing anion, $(CF_3SO_2)_2N^-$, $(C_2F_5SO_2)_2N^-$ or $(CF_3SO_2)(C_4F_9SO_2)N^-$ is more preferable. Examples of such an ambient temperature molten salt include trimethylpropylammonium-bis(trifluoromethylsulfonyl) imide, trimethyloctylammonium-bis(trifluoromethylsulfonyl)imide, trimethylallylammonium-bis(trifluoromethylsulfonyl)imide and trimethylhexylammonium-bis (trimethylfluorosulfonyl)imide.

In addition to the foregoing, there are exemplified N,N-diethyl-N-methyl-N-(2-methoxyethyl)ammonium-bis(trifluoromethylsulfonyl)imide (hereinafter referred to as "DEME-TFSI") and N,N-diethyl-N-methyl-N-(2-methoxyethyl)ammonium-tetrafluoroborate (hereinafter referred to as "DEME.BF$_4$").

Examples of the ambient temperature molten salt composed of a nitrogen-containing heterocyclic cation and a fluorine atom-containing anion include 1-ethyl-3-methylimidazolium-bis(trifluoromethylsulfonyl)imide (hereinafter referred to as "EMI-TFSI"), 1-ethyl-3-methylimidazolium-tetrafluoroborate (hereinafter referred to as "EMI.BF$_4$"), N-methyl-N-propylpiperidinium-bis(trifluoromethylsulfonyl)imide (hereinafter referred to as "PP13-TFSI") and N-methyl-N-propylpiperidinium-bis(fluorosulfonyl)imide (hereinafter referred to as "PP13-FSI").

(Non-Aqueous Electrolyte)

The non-aqueous electrolyte 6 in the non-aqueous electrolyte battery according to an embodiment contains a solvent having a relative dielectric constant of 20 or more, namely a so-called high-relative dielectric constant solvent. Examples of the solvent having a relative dielectric constant of 20 or more include EC, PC or compounds obtained by substituting a hydrogen atom thereof with other element such as a halogen or an alkyl group, or the like (for example, fluoroethylene carbonate); γ-butyrolactone, γ-valerolactone or solvents obtained by substituting a hydrogen atom thereof with a halogen. Above all, what fluoroethylene carbonate is contained is preferable because when charged or discharged, an activation barrier following desolvation drops, whereby when combined with the ambient temperature molten salt, an especially large effect is obtainable.

In addition to the solvent having a relative dielectric constant of 20 or more, it is possible to contain a solvent having a low relative dielectric constant, for example, dimethyl carbonate (DMC), diethyl carbonate (DEC), ethyl methyl carbonate (MEC), dipropyl carbonate, ethyl propyl carbonate and solvents obtained by substituting a hydrogen atom thereof with a halogen in the non-aqueous solvent.

In the non-aqueous electrolyte 6 in the non-aqueous electrolyte battery according to an embodiment, the content of the solvent having a relative dielectric constant of 20 or more is 60% by mass or more, and preferably 80% by mass or more relative to the whole of the non-aqueous solvent. Also, the content of the solvent having a relative dielectric constant of 20 or more may be 100% by mass. In the case where the total weight of the high-relative dielectric constant solvent is less than 60% relative to the weight of the whole of the solvent, it is difficult to obtain characteristics of the solvent having a high dielectric constant such as high ionic conductivity and viscosity. Also, in case of using such a non-aqueous solvent, for example, the non-aqueous solvent is volatilized by heat, etc., whereby the battery 1 is swollen due to the matters that the relative dielectric constant is low and that the weight of the low-boiling solvent is high.

The non-aqueous electrolyte battery according to an embodiment contains one or more kinds of the solvent having a relative dielectric constant of 20 or more and has the content of the solvent having a relative dielectric constant of 20 or more of 60% by mass or more relative to the whole of the non-aqueous solvent. Therefore, the non-aqueous solvent exhibits the characteristics of the high-relative dielectric constant solvent. That is, this non-aqueous solvent has characteristic features such as high ionic conductivity and high viscosity. Also, in addition to the high-relative dielectric constant solvent, when the solvent having a low relative dielectric constant is added, the viscosity becomes low, and, for example, wettability to the electrode is enhanced. The non-aqueous electrolyte having such a non-aqueous solvent well swells into the binder of PVDF having the ambient temperature molten salt taken thereinto and spreads over the entirety of the positive electrode and/or the negative electrode. Thus, the ionic conductivity of the positive electrode and/or the negative electrode becomes high, and the battery characteristics of the battery 1 are enhanced.

In addition to the foregoing non-aqueous solvent, the non-aqueous electrolyte 6 further contains an electrolyte salt. Any electrolyte salt which is soluble in the non-aqueous solvent is useful. Examples thereof include $LiPF_6$, $LiBF_4$, $LiN(CF_3SO_2)_2$, $LiN(C_2F_5SO_2)_2$ and $LiClO_4$. The electrolyte salt may be used singly or in admixture of plural kinds thereof.

The non-aqueous electrolyte 6 in the non-aqueous electrolyte battery according to an embodiment is a gel non-aqueous electrolyte held by a polymer compound capable of absorbing the foregoing non-aqueous electrolyte 6 and gelatinizing it. Examples of the polymer compound include polymers containing, as a repeating unit, polyvinylidene fluoride, polyethylene oxide, polypropylene oxide, polyacrylonitrile or polymethacrylonitrile. The polymer compound may be used singly or in admixture of plural kinds thereof.

(Separator)

The separator 7 isolates the negative electrode 5 and the positive electrode 4 from each other, prevents an internal short circuit to be caused due to contact of the both electrodes from occurring and passes a lithium ion through the non-aqueous electrolyte 6. The separator 7 may be electrically stable and chemically stable against the solvents and the active materials and may have no electrical conductivity. As the separator 7, a non-woven fabric of a polymer, a porous film or a material prepared by processing glass or ceramic fibers into a paper form is useful. Above all, a porous polyolefin film is favorable. Such a porous polyolefin film may be complexed with a heat-resistant material such as polyimides or glass or ceramic fibers.

(Exterior Material)

The exterior material 3 is, for example, one in which two or more layers of an insulating layer or a metal layer or the like are stacked and stuck by laminate processing or the like in such a manner that the insulating layer forms the inner surface of the battery. A material which constitutes the insulating layer is not particularly limited so far as it exhibits adhesiveness to the positive electrode lead 8 and the negative electrode lead 9. A material composed of a polyolefin resin such as polyethylene, polypropylene, modified polyethylene, modified polypropylene and copolymers thereof is useful because it is able to reduce the permeability and is excellent in air tightness. As the metal layer, for example, aluminum, stainless steel, nickel, iron or the like which is formed in a foil shape or a plate-like shape is useful. Also, when an insulating layer made of, for example, nylon is stacked in the outermost layer, the strength against breakage or piercing or the like can be increased.

<Manufacturing Method>

The battery 1 having the foregoing configuration is manufactured in the following manner.

First of all, the positive electrode 4 is prepared. In preparing the positive electrode 4, a positive electrode mixture coating solution containing a positive electrode active material, a binder and a conductive agent is prepared. In the case where an ambient temperature molten salt and polyvinylidene fluoride are contained in the positive electrode active material layer, these materials are contained in the positive electrode mixture coating solution. This positive electrode mixture coating solution is uniformly coated on the positive electrode collector 10 made of, for example, aluminum so as to provide the non-coated part 12 and then dried to form the positive electrode active material layer 11, which is subsequently cut into a prescribed size. Next, the positive electrode lead 8 is joined with the non-coated part 12 in which the positive electrode collector 10 is exposed by means of, for example, ultrasonic welding, spot welding, etc. There is thus prepared the stripe-shaped positive electrode 4.

Next, the negative electrode 5 is prepared. In preparing the negative electrode 5, a negative electrode mixture coating solution containing a negative electrode active material and a binder is prepared. In the case where an ambient temperature molten salt and polyvinylidene fluoride are contained in the negative electrode active material layer, these materials are contained in the negative electrode mixture coating solution. This negative electrode mixture coating solution is uniformly coated on the negative electrode collector 13 made of, for example, copper so as to provide the non-coated part 15 and then dried to form the negative electrode active material layer 14, which is subsequently cut into a prescribed form. Next, the negative electrode lead 9 is joined with the non-coated part 15 in which the negative electrode collector 13 is exposed by means of, for example, ultrasonic welding, spot welding, etc. There is thus prepared the stripe-shaped negative electrode 5.

The non-aqueous electrolyte 6 composed of a gel electrolyte is formed on each of the principal surface of the positive electrode active material layer 11 of the positive electrode 4 and the principal surface of the negative electrode active material layer 14 of the negative electrode 5 as thus prepared. In preparing the non-aqueous electrolyte 6, a non-aqueous electrolytic solution containing a non-aqueous solvent having a relative dielectric constant of 20 or more and an electrolyte salt is prepared; and this non-aqueous electrolytic solution is mixed with a polymer compound and a diluting solvent to prepare an electrolytic solution in a sol state. As the diluting solvent, for example, dimethyl carbonate (DMC) or the like can be used.

Next, this sol-state electrolytic solution is coated on each of the principal surface of the positive electrode active material layer 11 of the positive electrode 4 and the principal surface of the negative electrode active material layer 14 of the negative electrode 5. At that time, the polyvinylidene fluoride (PVdF)

having an ambient temperature molten salt taken thereinto, which is contained in the positive electrode active material layer 11 and/or the negative electrode active material layer 14 exhibits high swelling properties against the electrolyte solution, and therefore, the electrolytic solution is sufficiently immersed within the positive electrode active material layer 11.

Next, by volatilizing the diluting solvent in the electrolytic solution, the non-aqueous electrolyte 6 formed in a layered state is formed on each of the principal surface of the positive electrode active material layer 11 of the positive electrode 4 and the principal surface of the negative electrode active material layer 14 of the negative electrode 5. Since the thus formed non-aqueous electrolyte 6 is formed upon volatilization of the diluting solvent in a state that the electrolytic solution is sufficiently immersed in the positive electrode active material layer 11 and the negative electrode active material layer 14, it is uniformly spread over the positive electrode active material layer 11 and the negative electrode active material layer 14, whereby a contact area between the positive electrode active material and the negative electrode active material becomes large.

Next, the positive electrode 4 and the negative electrode 5, in each of which the non-aqueous electrolyte 6 is thus formed, are stacked via the separator 7 in such a manner that the non-aqueous electrolytes 6 are opposed to each other and flatly wound in the longitudinal direction of the separator 7, thereby forming the battery element 2. On that occasion, the positive electrode lead 8 and the negative electrode lead 9 are each projected from one end face of the battery element 2.

Next, this battery element 2 is contained inside the exterior material 3 while deriving the positive electrode lead 8 and the negative electrode lead 9, each of which is projected from the battery element 2, towards the outside. At that time, in the battery element 2, a resin piece 16 made of adhesive polypropylene, etc. is made to intervene between each of the positive electrode lead 8 and the negative electrode lead 9 and the exterior material 3. According to this, in the battery 1, a short circuit between each of the positive electrode lead 8 and the negative electrode lead 9 and the exterior material 3, a reduction of air tightness or the like is prevented from occurring.

Next, by sticking the peripheries of the exterior material 3 having the battery element 3 contained therein, the battery element 2 is sealed in the exterior material 3. According to this, the battery 1 using a gel electrolyte as the non-aqueous electrolyte is manufactured.

According to the thus manufactured battery 1, the binder made of PVdF having an ambient temperature molten salt taken thereinto is easily swollen with the non-aqueous solvent to be contained in the non-aqueous electrolyte 6. Therefore, the non-aqueous electrolyte 6 containing a non-aqueous solvent having a high-relative dielectric constant solvent is adequately immersed in the binder, whereby the non-aqueous electrolyte 6 can be uniformly spread over the positive electrode active material layer 11 and the negative electrode active material layer 14. According to this, in the battery 1, the contact area between the active material of the positive electrode 4 and/or the negative electrode 5 and the non-aqueous electrolyte 6 becomes large, and the ionic conductivity of the positive electrode 4 and/or the negative electrode 5 is increased, whereby the battery characteristics can be enhanced.

Also, according to the battery 1, by using PVdF having an ambient temperature molten salt taken thereinto as the binder, the degree of crystallization of the binder is lowered, the ionic conductivity of the positive electrode and/or the negative electrode containing this binder is increased, and the battery characteristics are enhanced.

Furthermore, according to the battery 1, even in the case where discharge is conducted under a low-temperature circumstance, since the degree of crystallization of PVdF into which an ambient temperature molten salt to be used as the binder is taken is low, a reduction of the ionic conductivity is suppressed, whereby favorable battery characteristics are obtainable.

In the foregoing embodiment, the battery element 2 preparing stacking the lengthy positive electrode 4 having the non-aqueous electrolyte 6 formed therein and the lengthy negative electrode 5 having the non-aqueous electrolyte 6 formed therein via the separator 7 and winding the stack has been used. However, the present application is not limited thereto. A stack type battery element prepared by stacking a positive electrode and a negative electrode via a gel non-aqueous electrolyte or a zigzag type battery element formed in a zigzag form without being wound may also be used.

Figure 5:
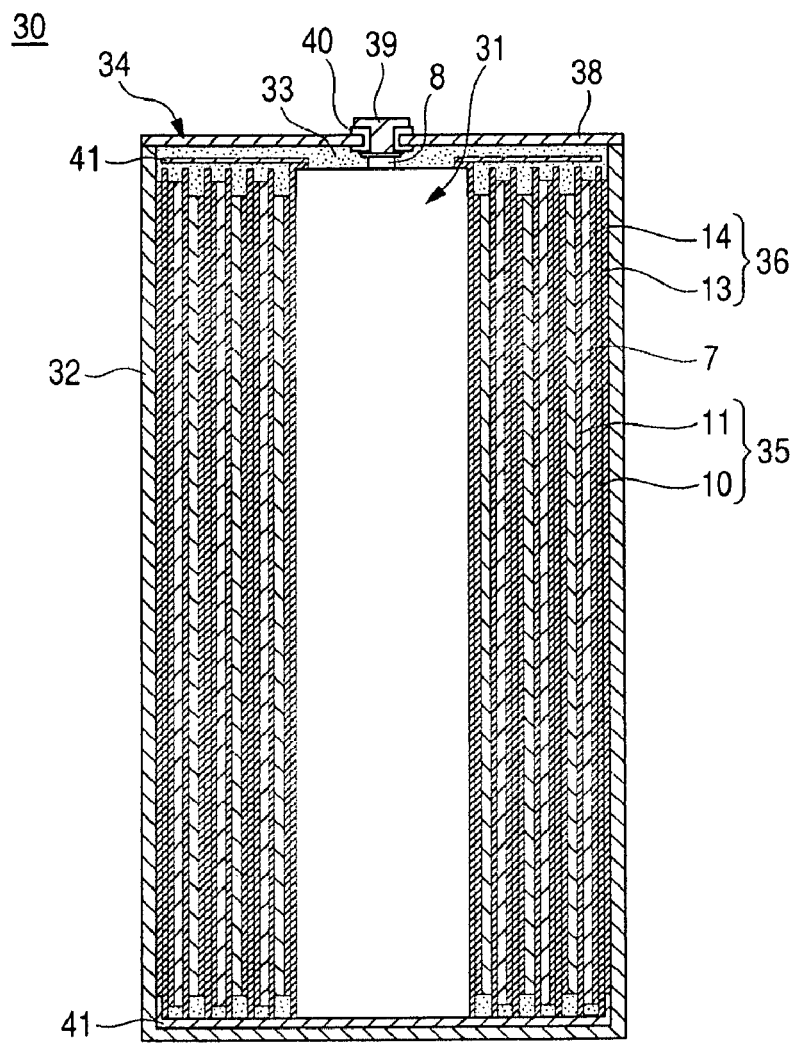
FIG. 5 is a cross-sectional view showing an internal structure of a non-aqueous electrolyte secondary battery according to an embodiment.

Though the foregoing embodiment has been described while referring to a polymer lithium battery using a non-aqueous electrolyte as an example, the present application is not limited thereto but is applicable to a non-aqueous electrolyte secondary battery 30 (hereinafter referred to as "battery 30") as shown in FIG. 5. With respect to the battery 30, descriptions of configurations and sites equivalent to those in the foregoing battery 1 are omitted and given the same symbols in FIG. 5.

This battery 30 includes an electrode body 31 as a power generation element; an exterior can 32 for containing the electrode body 31 therein; a non-aqueous electrolytic solution 33 composed of an electrolyte salt and a non-aqueous solvent; and a battery cover 34 for sealing the exterior can 32. The battery 30 has a structure in which the electrode body 31 is contained in the exterior can 32, the prepared non-aqueous electrolytic solution 33 is poured into the exterior can 32, and the battery cover 34 is welded with an opening of the exterior can 32 and sealed.

Figure 6:
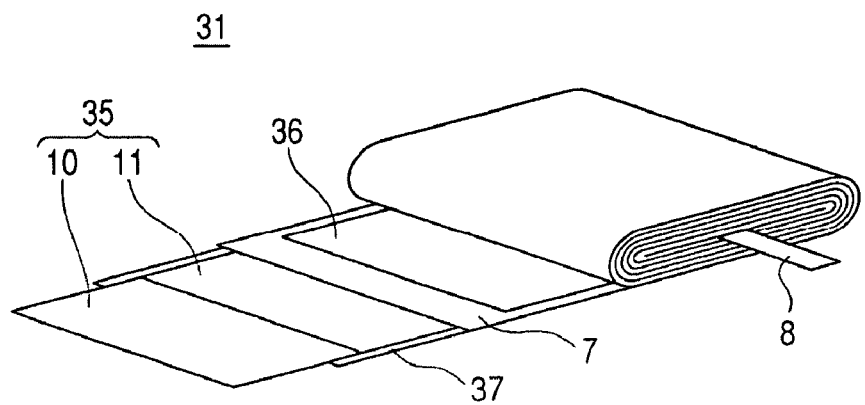
FIG. 6 is a perspective view of a battery element to be used in a non-aqueous electrolyte secondary battery according to an embodiment.

As shown in FIG. 6, the electrode body 31 has a structure in which a lengthy positive electrode 35 and a lengthy negative electrode 36 are wound in a flat form several times via a separator 7, a positive electrode lead 8 installed in the positive electrode 35 is projected from one face thereof, and a negative electrode collector 37 is exposed in the outermost periphery. In the electrode body 31, since electrical continuity is conducted by bringing the negative electrode collector 37 exposed on the outermost periphery into contact with the battery 30, it is not required to install, for example, a terminal, a lead, etc. for the purpose of current collection in the negative electrode 36. Thus, the manufacture of a battery is simplified. On the other hand, in the electrode body 31, it is devised to conduct electrical continuity by electrically connecting the positive electrode lead 8 to the battery cover 34.

The positive electrode 35 has the same configuration as in the positive electrode 4 of the foregoing battery 1, and a positive electrode active material layer 11 is formed on a positive electrode collector 10. Similar to the case of the positive electrode 4 of the foregoing battery 1, an ambient temperature molten salt is contained. According to this, in the positive electrode 35, the binder exhibits high swelling properties against the non-aqueous electrolytic solution 33, and therefore, the non-aqueous electrolytic solution 33 can be spread over the positive electrode active material layer 11.

In the negative electrode 36, a negative electrode active material layer 14 containing a negative electrode active material and a binder is formed on the negative electrode collector 37. Similar to the case of the negative electrode 5 of the foregoing battery 1, an ambient temperature molten salt is contained in the negative electrode 36. According to this, in the negative electrode 36, the binder exhibits high swelling properties against the non-aqueous electrolytic solution 33, and therefore, the non-aqueous electrolytic solution 33 can be spread over the negative electrode active material layer 14.

The exterior can 32 is a cylindrical container having a shape of, for example, a rectangle or a flat column and is made of a conductive metal such as iron, stainless steel, nickel, aluminum, etc. For example, when the exterior can 32 is formed of iron, nickel plating or the like is provided on the surface thereof.

Similar to the case of the non-aqueous electrolytic solution to be used in the foregoing battery 1, the non-aqueous electrolytic solution 33 contains one or more kinds of a solvent having a relative dielectric constant of 20 or more, namely a high-relative dielectric constant solvent and is prepared by dissolving an electrolyte salt such as $LiPF_6$ or $LiBF_4$ in a non-aqueous solvent in which the total weight of the high-relative dielectric constant solvent accounts for 60% or more.

Since the non-aqueous solvent contains one or more kinds of a high-relative dielectric constant solvent, with the total weight of the high-relative dielectric constant solvent being 60% or more relative to the weight of the whole of the solvent, it has the characteristic features of the high-relative dielectric constant solvent. That is, the non-aqueous solvent has characteristic features of high ionic conductivity and viscosity.

In the non-aqueous solvent, in the case where the total weight of the high-relative dielectric constant solvent is less than 60% relative to the weight of the whole of the solvent, it is difficult to obtain the characteristic features of the high-relative dielectric constant solvent. Also, in case of using such a non-aqueous solvent, for example, the non-aqueous solvent is evaporated by heat, etc., whereby the battery 1 is swollen due to the matters that the relative dielectric constant is low and that the proportion of the low-boiling solvent is high.

The battery cover 34 has a structure in which a terminal part 39 is interfitted in an approximately central part of a sealing plate material 38 via an insulating gasket 40. In the case where the exterior can 32 is electrically connected to the negative electrode 36, the sealing plate material 38 is formed of, for example, iron, stainless steel, nickel, etc. In particular, in the case where the sealing plate material 38 is formed of iron, nickel plating or the like is provided on the surface thereof. In the case where the positive electrode lead 8 is connected to the terminal part 39, the terminal part 39 is formed of, for example, aluminum, etc. For the insulating gasket 40, for example, an insulating resin such as polypropylene is used.

The battery 30 having the foregoing configuration is manufactured in the following manner. First of all, the positive electrode 35 is prepared in the same manner as in the positive electrode 4 of the foregoing battery 1.

Next, the negative electrode 38 is prepared. The negative electrode 38 is prepared in the same manner as in the foregoing negative electrode 5 such that the non-coated part 14 in which the negative electrode collector 13 is exposed is made longer than the foregoing negative electrode 5 and that this non-coated part 14 is made to work as the negative electrode lead 9 without providing a lead of a stripe-shaped metal piece.

Next, the positive electrode 35 and the negative electrode 38 as thus prepared are stacked via the lengthy separator 7 and wound in a flat form several times, thereby preparing the electrode body 31. At that time, the electrode body 31 has a wound structure in which the positive electrode lead 8 is projected from one end face in the width direction of the separator 7, and the negative electrode collector 13 is exposed on the outermost periphery.

Next, the electrode body 31 is contained in the exterior can 32 in a state that an insulating plate 41 is inserted into a bottom of the exterior can 32 and that an insulating plate 41 is placed on an end face of the electrode body 31 on the side where the positive electrode lead 8 is projected. Next, an end of the positive electrode lead 8 is welded with the battery cover 34.

Next, the non-aqueous electrolytic solution 33 is poured into the exterior can 32 having the electrode body 31 contained therein. At that time, the non-aqueous electrolytic solution 33 is immersed in the positive electrode and/or the negative electrode. Next, the sealing part of the exterior can 32 and the peripheral part of the sealing plate material 38 of the battery cover 34 are closely welded with each other by means of, for example, laser welding, etc. and sealed. According to this, the exterior can 32 and the sealing plate material 38 work as an external negative electrode of the battery 30 upon electrical continuity with the negative electrode 36. Also, the terminal part 39 works an external positive electrode of the battery 30 upon electrical continuity with the positive electrode 35. There is thus manufactured the battery 30.

According to the thus manufactured battery 30, similar to the case of the foregoing battery 1, by using PVdF having an ambient temperature molten salt taken thereinto as the binder of the positive electrode 4 and/or the negative electrode 5, the binder is easily swollen with the non-aqueous solvent to be contained in the non-aqueous electrolyte 33. Therefore, the non-aqueous electrolyte 33 containing a high-relative dielectric constant solvent is adequately immersed in the binder, whereby the non-aqueous electrolyte 33 can be uniformly spread over the positive electrode active material layer 11 and/or the negative electrode active material layer 14. According to this, in the battery 30, the ionic conductivity of the positive electrode 4 and/or the negative electrode 5 is increased, whereby the battery characteristics can be enhanced.

Also, according to the battery 30, by using PVdF having an ambient temperature molten salt taken thereinto as the binder, the degree of crystallization of the binder is lowered, the ionic conductivity of the positive electrode 4 and/or the negative electrode 5 containing this binder is increased, and the battery characteristics are enhanced.

Furthermore, according to the battery 30, even in the case where discharge is conducted under a low-temperature circumstance, since the degree of crystallization of PVdF into which an ambient temperature molten salt to be used as the binder is taken is low, a reduction of the ionic conductivity is suppressed, whereby favorable battery characteristics are obtainable.

EXAMPLES

Examples 1-1 to 1-9 and Comparative Example 1-1

A sample in which a polymer lithium secondary battery using a gel electrolyte was actually prepared as the non-aqueous electrolyte secondary battery to which the present application was applied is described.

In Examples 1-1 to 1-9, an ambient temperature molten salt was contained in a positive electrode. In preparing a positive electrode, 92 parts by mass of lithium cobaltate ($LiCoO_2$) as a positive electrode active material, 3 parts by mass of powdery PVdF as a binder, a prescribed mass part of DEME-TFSI as an ambient temperature molten salt, 5 parts by mass of powdery graphite as a conductive agent and N-methylpyrrolidone (hereinafter referred to as "NMP") were added, and the mixture was kneaded and dispersed by a planetary mixer, thereby preparing a positive electrode mixture coating solution. In Examples 1-8 to 1-9, DEME-TFSI in which a prescribed mass part of LiTFSI had been previously dissolved was used. Next, the positive electrode mixture coating solution was uniformly coated on the both surfaces of an aluminum foil as a positive electrode collector by using a coating unit, dried in vacuo at 100° C. for 24 hours, thereby forming a positive electrode active material layer and then compression molded by a roll press, followed by cutting into a size of 48 mm in width and 300 mm in length. Thereafter, an end of the cut piece was welded with an aluminum ribbon as a positive electrode lead. The positive electrode active layer had a volume density of 3.55 g/cm$^3$ and a thickness per one surface of 50 μm. There was thus prepared a positive electrode.

Next, a negative electrode was prepared. In preparing a negative electrode, 90% by mass of a meso-phase based spherical graphite as a negative electrode active material, 10% by mass of powdery polyvinylidene fluoride as a binder and NMP were added, and the mixture was kneaded and dispersed by a planetary mixer, thereby preparing a negative electrode mixture coating solution. Next, the negative electrode mixture coating solution was uniformly coated on the both surfaces of a copper foil as a negative electrode collector by using a coating unit, dried in vacuo at 120° C. for 24 hours, thereby forming a negative electrode active material layer and then compression molded by a roll press, followed by cutting into a size of 50 mm in width and 310 mm in length. Thereafter, an end of the cut piece was welded with a nickel ribbon as a negative electrode lead. The negative electrode active layer had a volume density of 1.62 g/cm$^3$ and a thickness per one surface of 48 μm. There was thus prepared a negative electrode.

Next, a non-aqueous electrolyte was formed on the principal surface of each of the thus prepared plural positive electrodes and negative electrodes. In preparing a non-aqueous electrolyte, a non-aqueous electrolytic solution in which in a non-aqueous solvent of a mixture of 40% by mass of ethylene carbonate (EC) having a relative dielectric constant 89 and 60% by mass of propylene carbonate (PC) having a relative dielectric constant of 64, LiPF$_6$ was dissolved in an amount of 0.78 moles/kg relative to the weight of this non-aqueous solvent was prepared. Next, this non-aqueous electrolytic solution, PVdF having 6% of hexafluoropropylene copolymerized therewith and dimethyl carbonate were mixed and stirred to prepare a non-aqueous electrolytic solution in a sol state. Next, this sol electrolytic solution was coated on the principal surface of each of the positive electrode and the negative electrode, and the dimethyl carbonate was volatilized, thereby forming the non-aqueous electrolyte composed of a gel electrolyte on the principal surface of each of the positive electrode and the negative electrode.

The positive electrode and the negative electrode each having a non-aqueous electrolyte on the principal surface thereof were stuck in a state that a separator made of a porous polyethylene film having a thickness of 10 μm was made to intervene between the both electrodes such that the non-aqueous electrolytes were opposed to each other and flatly wound, thereby preparing a battery element.

Next, the battery element was contained in the inside of an exterior material in which an aluminum foil was interposed between a pair of resin films while deriving the positive electrode lead and the negative electrode lead provided in the battery element towards the outside. At that time, the battery element was contained in the exterior material by interposing an adhesive propylene resin piece between each of the positive electrode lead and the negative electrode lead and the exterior material. Next, the peripheries of the exterior having the battery element contained therein were stuck by means of heat seal, thereby sealing the battery element in the exterior material. There was thus prepared a polymer lithium battery using a gel electrolyte.

The thus prepared polymer lithium batteries of Examples 1-1 to 1-9 and Comparative Example 1-1 were each measured with respect to a battery capacity and a charge-discharge cycle characteristic. The obtained results are shown in Table 1.

TABLE 1

| | Ambient temperature molten salt | | Amount of lithium electrolyte salt relative to ambient temperature molten salt | Non-aqueous solvent of non-aqueous electrolyte (% by mass) | | | | | | Battery capacity | Cycle characteristic |
|---|---|---|---|---|---|---|---|---|---|---|---|
| | | | | Solvent having a relative dielectric constant of 20 or more | | | Other non-aqueous solvent | | | | |
| | Kind | Content (Part by mass) | (mole/L) | EC | PC | FEC | DMC | MEC | DEC | (mAh) | (%) |
| Example 1-1 | DEME · TFSI | 0.05 | 0 | 40 | 60 | — | — | — | — | 1018 | 78 |
| Example 1-2 | DEME · TFSI | 0.1 | 0 | 40 | 60 | — | — | — | — | 1020 | 80 |
| Example 1-3 | DEME · TFSI | 1 | 0 | 40 | 60 | — | — | — | — | 1021 | 82 |
| Example 1-4 | DEME · TFSI | 3 | 0 | 40 | 60 | — | — | — | — | 1015 | 83 |
| Example 1-5 | DEME · TFSI | 5 | 0 | 40 | 60 | — | — | — | — | 1005 | 81 |
| Example 1-6 | DEME · TFSI | 7 | 0 | 40 | 60 | — | — | — | — | 1001 | 79 |
| Example 1-7 | DEME · TFSI | 10 | 0 | 40 | 60 | — | — | — | — | 992 | 71 |
| Example 1-8 | DEME · TFSI | 1 | 0.5 | 40 | 60 | — | — | — | — | 1024 | 89 |
| Example 1-9 | DEME · TFSI | 1 | 1.0 | 40 | 60 | — | — | — | — | 1024 | 90 |
| Comparative Example 1-1 | DEME · TFSI | 0 | 0 | 40 | 60 | — | — | — | — | 1007 | 64 |

In Table 1, the battery capacity and the charge-discharge cycle characteristic of each of the samples were evaluated in the following manners. That is, with respect to the battery capacity, each sample was subjected to constant-current constant-voltage charge under a charge condition at 0.5 C and 4.2 V for 6 hours and then subjected to constant-current discharge at a current value of 0.2 C until it reached 3 V. The capacity at that time was defined as the battery capacity. In the present Examples, a sample having a battery capacity falling within the range of from 950 mAh to 1,050 mAh was defined as an article of good quality.

The charge-discharge cycle characteristic is a ratio of a discharge capacity at the 500th cycle to a discharge capacity at the first cycle. With respect to the discharge capacity at the first cycle, each sample was subjected to constant-current constant-voltage charge under a charge condition at 1.0 C and 4.2 V for 3 hours and then subjected to constant-current discharge at a current value of 1.0 C until it reached 3 V. The capacity at that time was defined as the discharge capacity at the first cycle. The discharge capacity at the 500th cycle is a capacity obtained by conducting one cycle 500 times. In the present Examples, a sample having a charge-discharge cycle characteristic of 70% or more was defined as an article of good quality.

It was noted from the results of Table 1 that in Examples 1-1 to 1-9 each containing an ambient temperature molten salt, the charge-discharge cycle characteristic was large as compared with that of Comparative Example 1-1 not containing an ambient temperature molten salt. In Comparative Example 1-1, since an ambient temperature molten salt was not taken into PVdF, the degree of crystallization of the binder could not be reduced; and since the ionic conductivity of the positive electrode was lowered, a favorable charge-discharge cycle characteristic was not obtainable. On the other hand, in Examples 1-1 to 1-9, since the ambient temperature molten salt was taken into PVDF, the non-aqueous solvent in the non-aqueous electrolyte was well swollen in the binder, the non-aqueous electrolyte was spread over the entirety of the positive electrode, and thus, the contact area between the positive electrode material and the non-aqueous electrolyte became large, whereby the charge-discharge cycle characteristic was enhanced. In particular, in Examples 1-8 and 1-9 each having LiTFSI dissolved therein, the mobility of a lithium ion within the electrode was further increased, whereby a high effect was obtained.

Also, when the content of the ambient temperature molten salt in the positive electrode active material layer decreased to 0.05 parts by mass, the ionic conductivity was not sufficiently increased, and thus, the effect was small. When the amount of the ambient temperature molten salt increased to more than 7 parts by mass, the electrolytic solution was excessively swollen in PVdF; the cell was swollen during the charge and discharge; the cycle characteristic was not improved; and the effect was small. Accordingly, it was noted that when an optimal amount of the ambient temperature molten salt in the active material layer falls within the range of from 0.1 to 5 parts by mass, the effect is most likely exhibited.

Examples 2-1 to 2-7 and Comparative Examples 2-1 to 2-2

In Examples 2-1 to 2-7 and Comparative Examples 2-1 to 2-2, the same tests as in Example 1-3 were carried out, except for changing the proportion and kind of the non-aqueous solvent of the non-aqueous electrolytic solution as shown in Table 2. A relative dielectric constant of fluoroethylene carbonate (FEC) is 78.4.

Examples 2-1 to 2-7 and Comparative Examples 2-1 to 2-2 were each measured with respect to a battery capacity and a charge-discharge cycle characteristic. The obtained results are shown in Table 2.

TABLE 2

| | Ambient temperature molten salt | | Amount of lithium electrolyte salt relative to ambient temperature molten salt | Non-aqueous solvent of non-aqueous electrolyte (% by mass) | | | | | | Battery capacity | Cycle characteristic |
|---|---|---|---|---|---|---|---|---|---|---|---|
| | | | | Solvent having a relative dielectric constant of 20 or more | | | Other non-aqueous solvent | | | | |
| | Kind | Content (Part by mass) | (mole/L) | EC | PC | FEC | DMC | MEC | DEC | (mAh) | (%) |
| Example 1-3 | DEME·TFSI | 1 | 0 | 40 | 60 | — | — | — | — | 1021 | 82 |
| Example 2-1 | DEME·TFSI | 1 | 0 | 60 | 40 | — | — | — | — | 1021 | 81 |
| Example 2-2 | DEME·TFSI | 1 | 0 | 45 | 35 | — | — | — | 20 | 1024 | 85 |
| Example 2-3 | DEME·TFSI | 1 | 0 | 50 | 40 | 10 | — | — | — | 1025 | 90 |
| Example 2-4 | DEME·TFSI | 1 | 0 | — | 60 | 40 | — | — | — | 1025 | 90 |
| Example 2-5 | DEME·TFSI | 1 | 0 | 40 | 50 | 10 | — | — | — | 1025 | 91 |
| Example 2-6 | DEME·TFSI | 1 | 0 | 35 | 35 | 10 | — | — | 20 | 1024 | 91 |
| Example 2-7 | DEME·TFSI | 1 | 0 | 45 | 20 | — | 15 | — | 20 | 1020 | 75 |
| Comparative Example 2-1 | DEME·TFSI | 1 | 0 | 45 | 10 | — | — | 20 | 25 | 993 | 62 |
| Comparative Example 2-2 | DEME·TFSI | 1 | 0 | 35 | 20 | | 15 | | 30 | 1013 | 63 |

In Comparative Examples 2-1 to 2-2, since the content of the solvent having a relative dielectric constant of 20 or more in the non-aqueous solvent is less than 60% by mass, the relative dielectric constant is low, and the content of a low-boiling solvent is high. Therefore, this solvent was evaporated by heat; the exterior material was deformed; the swelling of the battery was large; and the cycle characteristic was lowered. Also, it was noted from the results of Examples 2-3 to 2-6 that by containing fluoroethylene carbonate as the solvent having a relative dielectric constant of 20 or more, an extremely favorable cycle characteristic is obtainable.

Examples 3-1 to 3-6

In Examples 3-1 to 3-6, the same tests as in Example 1-3 were carried out, except for changing the kind of the ambient temperature molten salt as shown in Table 3. The results obtained by measuring a battery capacity and a charge-discharge cycle characteristic are shown in Table 3.

TABLE 3

| | Ambient temperature molten salt | | Amount of lithium electrolyte salt relative to ambient temperature | Non-aqueous solvent of non-aqueous electrolyte (% by mass) | | | | | | Battery capacity | Cycle characteristic |
| | | | | Solvent having a relative dielectric constant of 20 or more | | | Other non-aqueous solvent | | | | |
| | Kind | Content (Part by mass) | molten salt (mole/L) | EC | PC | FEC | DMC | MEC | DEC | (mAh) | (%) |
|---|---|---|---|---|---|---|---|---|---|---|---|
| Example 1-3 | DEME · TFSI | 1 | 0 | 40 | 60 | — | — | — | — | 1021 | 82 |
| Example 3-1 | EMI · TFSI | 1 | 0 | 40 | 60 | — | — | — | — | 1021 | 80 |
| Example 3-2 | PP13 · TFSI | 1 | 0 | 40 | 60 | — | — | — | — | 1021 | 83 |
| Example 3-3 | EMI · BF4 | 1 | 0 | 40 | 60 | — | — | — | — | 1022 | 80 |
| Example 3-4 | DEME · BF4 | 1 | 0 | 40 | 60 | — | — | — | — | 1022 | 82 |
| Example 3-5 | EMI · FSI | 1 | 0 | 40 | 60 | — | — | — | — | 1021 | 79 |
| Example 3-6 | PP13 · FSI | 1 | 0 | 40 | 60 | — | — | — | — | 1020 | 83 |

In Examples 3-1 to 3-6, even by changing the kind of the ambient temperature molten salt, the effect for enhancing a cycle characteristic was similarly obtained as in Example 1-3. In particular, it was noted that by using an ambient temperature molten salt having a quaternary ammonium cation structure as in DEME and PP13, electrochemical stability was excellent so that a higher effect was obtained.

Examples 4-1 to 4-9

In Examples 4-1 to 4-9, an ambient temperature molten salt was contained in the negative electrode instead of containing an ambient temperature molten salt in the positive electrode. In preparing a negative electrode, 90% by mass of a mesophase based spherical graphite as a negative electrode active material, a prescribed mass part of DEME-TFSI as an ambient temperature molten salt, 10% by mass of powdery polyvinylidene fluoride as a binder and NMP were added, and the mixture was kneaded and dispersed by a planetary mixer, thereby preparing a negative electrode mixture coating solution. Next, the negative electrode mixture coating solution was uniformly coated on the both surfaces of a copper foil as a negative electrode collector by using a coating unit, dried in vacuo at 120° C. for 24 hours, thereby forming a negative electrode active material layer and then compression molded by a roll press, followed by cutting into a size of 50 mm in width and 310 mm in length. Thereafter, an end of the cut piece was welded with a nickel ribbon as a negative electrode lead. There was thus prepared a negative electrode. The same tests as in Example 1-1 were carried out, except for changing the electrode in which the ambient temperature molten salt was contained. The results obtained by measuring a battery capacity and a charge-discharge cycle characteristic are shown in Table 4.

TABLE 4

| | Ambient temperature molten salt | | Amount of lithium electrolyte salt relative to ambient temperature | Non-aqueous solvent of non-aqueous electrolyte (% by mass) | | | | | | Battery capacity | Cycle characteristic |
| | | | | Solvent having a relative dielectric constant of 20 or more | | | Other non-aqueous solvent | | | | |
| | Kind | Content (Part by mass) | molten salt (mole/L) | EC | PC | FEC | DMC | MEC | DEC | (mAh) | (%) |
|---|---|---|---|---|---|---|---|---|---|---|---|
| Example 4-1 | DEME · TFSI | 0.05 | 0 | 40 | 60 | — | — | — | — | 1018 | 81 |
| Example 4-2 | DEME · TFSI | 0.1 | 0 | 40 | 60 | — | — | — | — | 1020 | 85 |
| Example 4-3 | DEME · TFSI | 1 | 0 | 40 | 60 | — | — | — | — | 1021 | 86 |
| Example 4-4 | DEME · TFSI | 3 | 0 | 40 | 60 | — | — | — | — | 1015 | 82 |
| Example 4-5 | DEME · TFSI | 5 | 0 | 40 | 60 | — | — | — | — | 1005 | 80 |
| Example 4-6 | DEME · TFSI | 7 | 0 | 40 | 60 | — | — | — | — | 1001 | 75 |
| Example 4-7 | DEME · TFSI | 10 | 0 | 40 | 60 | — | — | — | — | 992 | 72 |
| Example 4-8 | DEME · TFSI | 1 | 0.5 | 40 | 60 | — | — | — | — | 1024 | 93 |
| Example 4-9 | DEME · TFSI | 1 | 1.0 | 40 | 60 | — | — | — | — | 1024 | 92 |
| Comparative Example 1-1 | DEME · TFSI | 0 | 0 | 40 | 60 | — | — | — | — | 1007 | 64 |

As is clear from the results of Table 4, in Examples 4-1 to 4-9 each containing an ambient temperature molten salt, the charge-discharge cycle characteristic was large as compared with that of Comparative Example 1-1 not containing an ambient temperature molten salt. In Comparative Example 1-1, since an ambient temperature molten salt was not taken into PVdF, the degree of crystallization of the binder could not be reduced; and since the ionic conductivity of the negative electrode was lowered, a favorable charge-discharge cycle characteristic was not obtainable. On the other hand, in Examples 4-1 to 4-9, since the ambient temperature molten salt was taken into PVdF, the non-aqueous solvent in the non-aqueous electrolyte was well swollen in the binder, the non-aqueous electrolyte was spread over the entirety of the negative electrode, and thus, the contact area between the negative electrode material and the non-aqueous electrolyte became large, whereby the charge-discharge cycle characteristic was enhanced. In particular, in Examples 4-8 to 4-9 each having LiTFSI dissolved therein, the mobility of a lithium ion within the electrode was further increased, whereby a high effect was obtained.

Also, when the content of the ambient temperature molten salt in the negative electrode active material layer decreased to 0.05 parts by mass, the ionic conductivity was not sufficiently increased, and thus, the effect was small. When the amount of the ambient temperature molten salt increased to more than 7 parts by mass, the electrolytic solution was excessively swollen in PVdF; the cell was swollen during the charge and discharge; the cycle characteristic was not improved; and the effect was small. Accordingly, it was noted that when an optimal amount of the ambient temperature molten salt in the negative electrode active material layer falls within the range of from 0.1 to 5 parts by mass, the effect is most likely exhibited.

It has become clear from the foregoing facts that what an ambient temperature molten salt and polyvinylidene fluoride are previously contained in an electrode of a non-aqueous electrolyte secondary battery, at least one kind of a solvent having a relative dielectric constant of 20 or more is contained in a non-aqueous electrolyte and a non-aqueous solvent in which the total weight of the foregoing solvent is 60% by mass or more relative to the whole of the non-aqueous solvent is used is effective in preparing a non-aqueous electrolyte secondary battery in which a lowering of battery characteristics is suppressed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolyte battery comprising:
a positive electrode;
a negative electrode; and
a gel non-aqueous electrolyte containing a non-aqueous electrolyte solvent, wherein
at least one of the positive electrode and the negative electrode has an active material layer containing an ambient temperature molten salt and polyvinylidene fluoride;
the ambient temperature molten salt is occluded within a polymer network matrix of the polyvinylidene fluoride;
the non-aqueous electrolyte solvent contains at least one of propylene carbonate and ethylene carbonate; and
a total content of solvents having a relative dielectric constant of 20 or more in the non-aqueous electrolyte is 60% by mass or more relative to the whole of the non-aqueous electrolyte solvent.

2. The non-aqueous electrolyte battery according to claim 1, wherein
the non-aqueous electrolyte solvent further contains at least one solvent having a relative dielectric constant of 20 or more selected from the group consisting of a compound obtained by substituting a hydrogen atom thereof with a halogen, an alkyl group or a halogenated alkyl group.

3. The non-aqueous electrolyte battery according to claim 1, wherein
the active material layer contains an active material, a conductive agent and a binder; and
the content of the ambient temperature molten salt in the active material layer is from 0.1 to 5 parts by mass relative to the total mass of the active material, the conductive agent and the binder in the active material layer.

4. The non-aqueous electrolyte battery according to claim 1, wherein
the ambient temperature molten salt contains a tertiary or quaternary ammonium salt composed of a tertiary or quaternary ammonium cation and a fluorine atom-containing anion.

5. The non-aqueous electrolyte battery according to claim 4, wherein
the tertiary or quaternary ammonium cation is a cation having a structure represented by any one of the following formulae (1) to (5):

(1)

wherein R11 to R14 each independently represents an aliphatic group, an aromatic group, a heterocyclic group or a group in which a part of the element or elements of any one of these groups is substituted with a substituent,

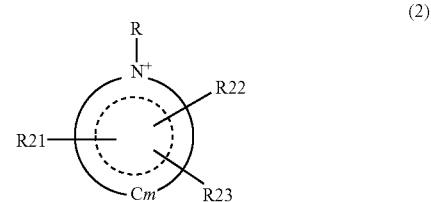
(2)

(3)

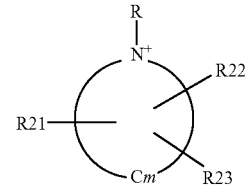

wherein m is from 4 to 5; R21 to R23 each independently represents a hydrogen atom, an alkyl group having from 1 to 5 carbon atoms, an alkoxy group, an amino group or a nitro group and may be the same or different; R represents a hydrogen atom or an alkyl group having from 1 to 5 carbon atoms; and the nitrogen atom is a tertiary or quaternary ammonium cation, and

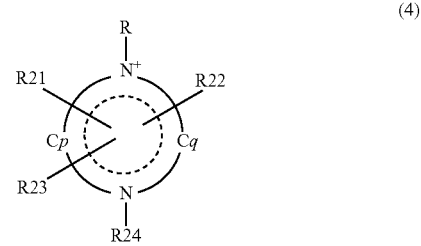
(4)

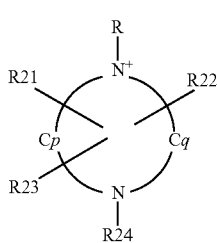

(5)

wherein p is from 0 to 2; (p+q) is from 3 to 4; R21 to R23 each independently represents a hydrogen atom, an alkyl group having from 1 to 5 carbon atoms, an alkoxy group, an amino group or a nitro group and may be the same or different; R24 represents an alkyl group having from 1 to 5 carbon atoms; R represents a hydrogen atom or an alkyl group having from 1 to 5 carbon atoms; and the nitrogen atom is a tertiary or quaternary ammonium cation.

6. The non-aqueous electrolyte battery according to claim 5, wherein the cation having a structure represented by any one of the formulae (1) to (5) is an alkyl quaternary ammonium cation, an N-methyl-N-propylpiperidinium cation or an N,N-diethyl-N-methyl-N-(2-methoxyethyl)ammonium cation.

7. The non-aqueous electrolyte battery according to claim 4, wherein the fluorine atom-containing anion is $BF_4^-$, $(F-SO_2)_2-N^-$ or $(CF_3-SO_2)_2-N^-$.

8. The non-aqueous electrolyte battery according to claim 1, wherein the ambient temperature molten salt is selected from the group consisting of trimethylpropylammonium-bis(trifluoromethylsulfonyl)imide, trimethyloctylammonium-bis(trifluoromethylsulfonyl)imide, trimethylallylammonium-bis(trifluoromethylsulfonyl)imide, trimethylhexylammonium-bis(trimethylfluorosulfonyl)imide, N,N-diethyl-N-methyl-N-(2-methoxyethylammonium-bis(trifluoromethylsulfonyl)imide, N,N-diethyl-N-methyl-N-(2-methoxyethyl)ammonium-tetrafluoroborate, 1-ethyl-3-methylimidazolium-bis(trifluoromethylsulfonyl)imide, 1-ethyl-3-methylimidazolium-tetrafluoroborate, N-methyl-N-propylpiperidinium-bis(trifluoromethylsulfonyl)imide and N-methyl-N-propylpiperidinium-bis(fluorosulfonyl)imide.

9. The non-aqueous electrolyte battery according to claim 1, wherein the ambient temperature molten salt is N,N-diethyl-N-methyl-N-(2-methoxyethyl) ammonium-bis(trifluoromethylsulfonyl)imide.

10. The non-aqueous electrolyte battery according to claim 1, wherein the ambient temperature molten salt is N,N-diethyl-N-methyl-N-(2-methoxyethyl) ammonium-bis(trifluoromethylsulfonyl)imide in which lithium bis(trifluoromethylsulfonyl)imide is dissolved.

11. The non-aqueous electrolyte battery according to claim 1, wherein the total content of solvents having a relative dielectric constant of 20 or more in the non-aqueous electrolyte is 80% by mass or more relative to the whole of the non-aqueous electrolyte solvent.

12. The non-aqueous electrolyte battery according to claim 1, wherein the non-aqueous electrolyte solvent includes fluoroethylene carbonate.

13. A method for manufacturing a non-aqueous electrolyte battery including a positive electrode, a negative electrode and a gel non-aqueous electrolyte containing a non-aqueous electrolyte solvent, the method comprising the steps of:
    providing at least one of propylene carbonate and ethylene carbonate, with a total content of solvents having a relative dielectric constant of 20 or more being 60% by mass or more relative to the whole of the non-aqueous electrolyte solvent; and
    coating an electrode mixture coating solution containing an active material, an ambient temperature molten salt, polyvinylidene fluoride and an electrode solvent on a collector and then volatizing the electrode solvent to form at least one of a positive electrode active material layer and a negative electrode active material layer.

* * * * *